(12) United States Patent
Nappi, Sr.

(10) Patent No.: US 9,380,927 B2
(45) Date of Patent: Jul. 5, 2016

(54) MOUNTABLE FOOTWEAR CLEANER

(71) Applicant: LIBERTY PRODUCTS II LLC, Berlin, CT (US)

(72) Inventor: John J. Nappi, Sr., Berlin, CT (US)

(73) Assignee: Liberty Products II LLC, Berlin, CT (US)

( * ) Notice: Subject to any disclaimer, the term of this patent is extended or adjusted under 35 U.S.C. 154(b) by 0 days.

(21) Appl. No.: 13/739,713

(22) Filed: Jan. 11, 2013

(65) Prior Publication Data

US 2014/0196235 A1  Jul. 17, 2014

(51) Int. Cl.
| | |
|---|---|
| A47L 23/02 | (2006.01) |
| A47L 23/22 | (2006.01) |
| A47L 23/26 | (2006.01) |
| B60R 3/04 | (2006.01) |

(52) U.S. Cl.
CPC ............. *A47L 23/22* (2013.01); *A47L 23/02* (2013.01); *A47L 23/26* (2013.01); *A47L 23/263* (2013.01); *B60R 3/04* (2013.01)

(58) Field of Classification Search
CPC ........... B60R 3/04; A47L 23/00; A47L 23/02; A47L 23/20; A47L 23/205; A47L 23/22; A47L 23/26; A47L 23/263; A47L 23/266
USPC .............. 15/30–37, 97.2, 112, 161, 310, 311, 15/347, 349; 280/164.2; 285/7
See application file for complete search history.

(56) References Cited

U.S. PATENT DOCUMENTS

| | | | |
|---|---|---|---|
| 870,679 A * | 11/1907 | Houghton ....................... 15/161 |
| 1,359,193 A * | 11/1920 | Parker ............................. 15/311 |
| 1,361,068 A * | 12/1920 | Karro ............................... 15/311 |
| 1,662,498 A * | 3/1928 | Gill et al. ........................ 15/36 |
| 2,278,794 A * | 4/1942 | Nelson ............................ 15/36 |
| 2,367,188 A * | 1/1945 | Anderson ............... A47L 9/242 285/304 |
| 2,463,153 A * | 3/1949 | Conklin .......................... 15/36 |
| 2,510,949 A * | 6/1950 | Bergsten ................ A47L 7/0085 285/261 |
| 2,523,770 A * | 9/1950 | Marette ................... A47L 9/242 285/317 |
| 2,647,271 A * | 8/1953 | Ryzenga .......................... 15/37 |
| 2,944,278 A * | 7/1960 | Bullard ........................... 15/311 |
| 2,951,714 A * | 9/1960 | Carlberg .................. A47L 9/242 285/140.1 |
| 3,048,867 A * | 8/1962 | Counts ............................ 15/36 |
| 3,060,475 A * | 10/1962 | Dufault ........................... 15/36 |
| 3,144,675 A * | 8/1964 | Canaan ............................ 15/311 |
| 3,233,266 A * | 2/1966 | Darby ............................ 15/37 |
| 3,445,875 A * | 5/1969 | Bohannon ...................... 15/36 |
| 3,649,994 A * | 3/1972 | Harris ............................. 15/311 |
| 3,737,942 A * | 6/1973 | Casey ............................. 15/339 |
| 3,802,021 A * | 4/1974 | Schulz ............................ 15/36 |
| 4,024,599 A * | 5/1977 | Gamboa ......................... 15/311 |
| 4,358,867 A * | 11/1982 | Berta .............................. 15/36 |
| 5,057,131 A * | 10/1991 | Lackner ................. A47L 9/1427 15/347 |
| 5,711,048 A * | 1/1998 | Pink ........................ A47L 5/14 15/330 |
| 5,991,967 A * | 11/1999 | Williams ........................ 15/311 |
| 2005/0034254 A1* | 2/2005 | Morsy ............................ 15/28 |

FOREIGN PATENT DOCUMENTS

| | | | |
|---|---|---|---|
| GB | 893182 | * | 4/1962 |
| GB | 1033864 | * | 6/1966 |

* cited by examiner

*Primary Examiner* — Mark Spisich
(74) *Attorney, Agent, or Firm* — Ziegler IP Law Group, LLC.

(57) ABSTRACT

A footwear cleaning apparatus including a housing having an opening, an internal cavity and a discharge aperture, the internal cavity being shaped to move debris through the discharge aperture, a cover for at least partly covering the opening, and a brush assembly connected to the housing.

18 Claims, 7 Drawing Sheets

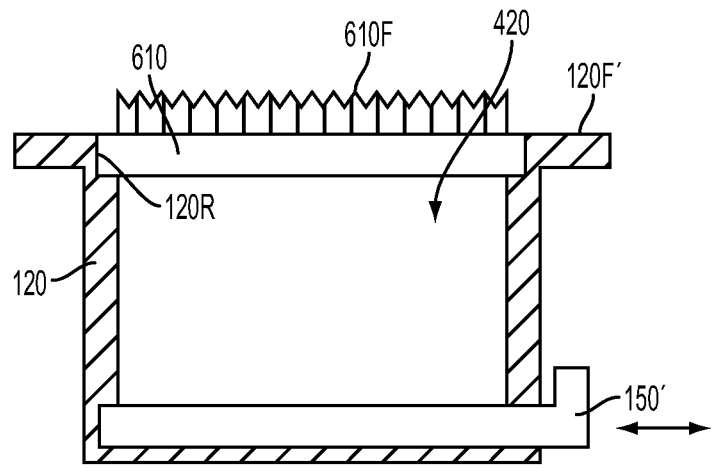
FIG. 7A
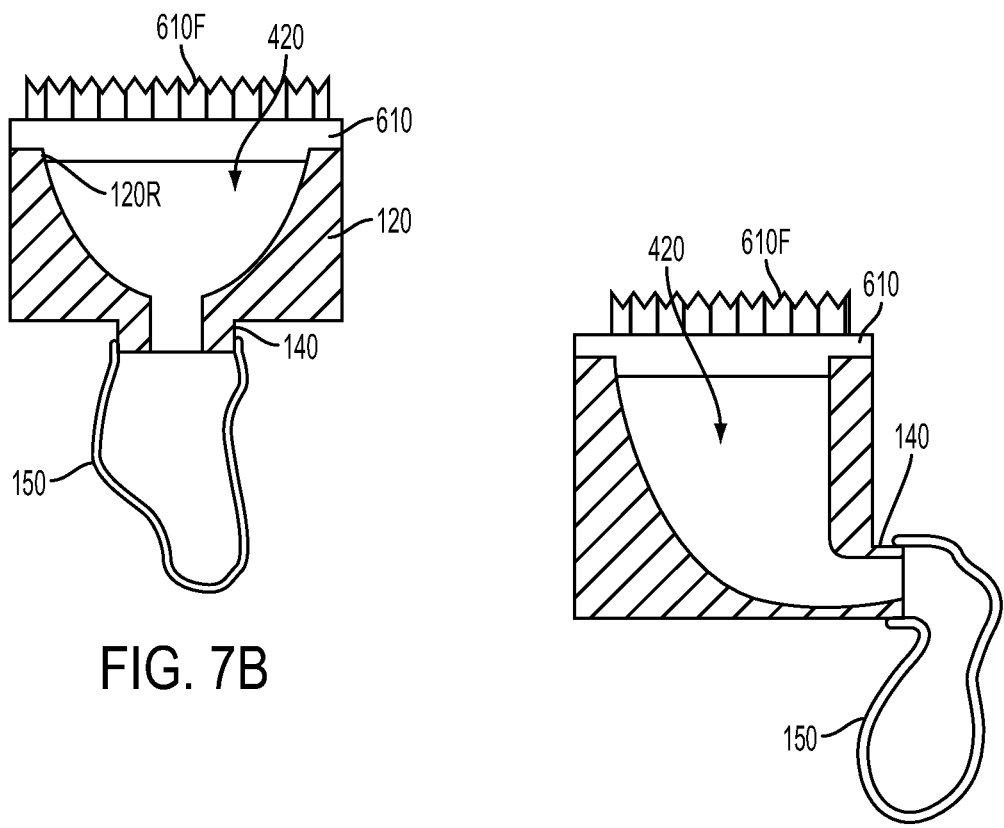
FIG. 7B
FIG. 7C

MOUNTABLE FOOTWEAR CLEANER

BACKGROUND

The aspects of the disclosed embodiment generally relate to shoe cleaners and, more particularly, to surface mount shoe cleaners.

When a person returns indoors or enters their automobile after walking through, for example, ice, snow, mud, dust, or other material, the presence of which is not desirable indoors, it is desirable to clean the footwear either just before entry or upon entry to make certain that the undesirable material is not carried into a house, or other area by the footwear.

Shoe cleaning devices which utilize brushes for cleaning the various aspects of a shoe are known. In general, such devices utilize brushes, which are either fixed or power driven. These conventional devices utilize several brushes which are located in different parts of the device to, for example, clean the bottom, sides and top of a shoe. These devices are rather bulky and cannot be placed in small areas or hidden from view.

BRIEF DESCRIPTION OF THE DRAWINGS

The foregoing aspects and other features of the disclosed embodiment are explained in the following description, taken in connection with the accompanying drawings, wherein:

FIGS. 7A-7C are schematic cross-sectional illustrations of portions of a footwear cleaning apparatus in accordance with an aspect of the disclosed embodiment.

DETAILED DESCRIPTION OF THE EXEMPLARY EMBODIMENT(S)

Figure 1A:
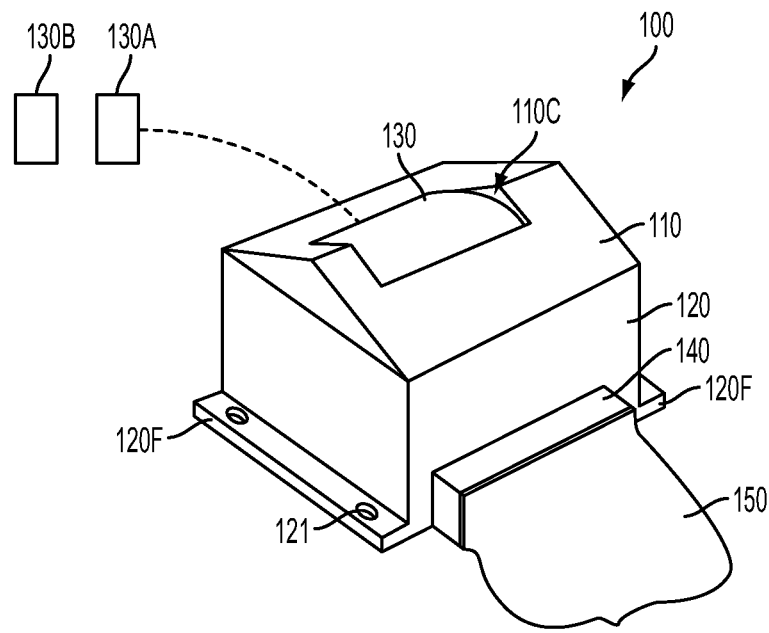
FIG. 1A is a schematic illustration of a footwear cleaning apparatus in accordance with an aspect of the disclosed embodiment.

FIG. 1A is a schematic illustration of a footwear cleaning apparatus 100 in accordance with an aspect of the disclosed embodiment. Although the aspects of the disclosed embodiment will be described with reference to the drawings, it should be understood that the aspects of the disclosed embodiment can be embodied in many alternate forms. In addition, any suitable size, shape or type of elements or materials could be used.

As used herein the term "footwear" will be used to refer to all manners of footwear including, but not limited to, shoes, sneakers, cleats, boots, socks, galoshes, slippers and bare feet. Furthermore, use of any singular term of type of footwear will be intended to mean any other type as well.

As can be seen in FIG. 1A, in accordance with an aspect of the disclosed embodiment the footwear cleaning apparatus 100 generally includes a housing 120, a cover 110, a discharge coupling 140, a debris collector 150 and a brush assembly 130. The housing 120 may have any suitable shape and size including, but not limited to, rectangular, circular, square and oval. In this example, the housing 120 has a rectangular shape when, for example, viewed from the top but may have any other suitable shape. The housing 120 may be constructed of any suitable material including, but not limited to, plastics, composites, metals and alloys. The housing 120 material may be impact resistant or have any other suitable characteristics to prevent damage to the housing 120 and the components housed therein.

Figure 1B:
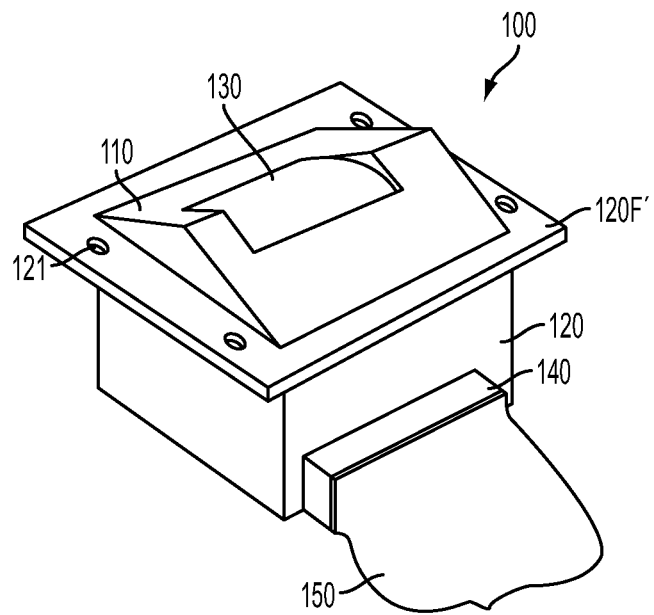
FIG. 1B is a schematic illustration of a footwear cleaning apparatus in accordance with an aspect of the disclosed embodiment.
Figure 3A:
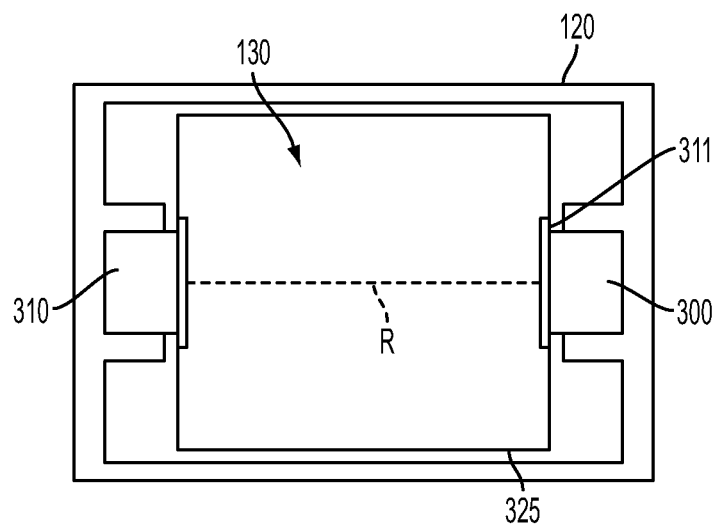
FIG. 3A is a schematic illustration of a portion of a footwear cleaning apparatus in accordance with an aspect of the disclosed embodiment.
Figure 3B:
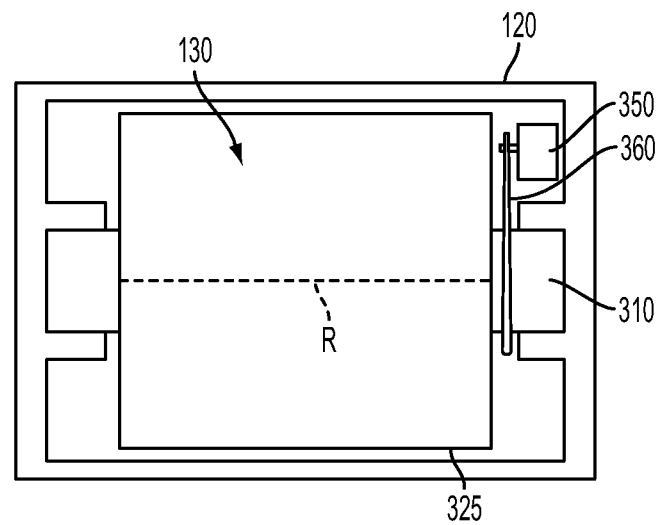
FIG. 3B is a schematic illustration of a portion of a footwear cleaning apparatus in accordance with an aspect of the disclosed embodiment.
Figure 4A:
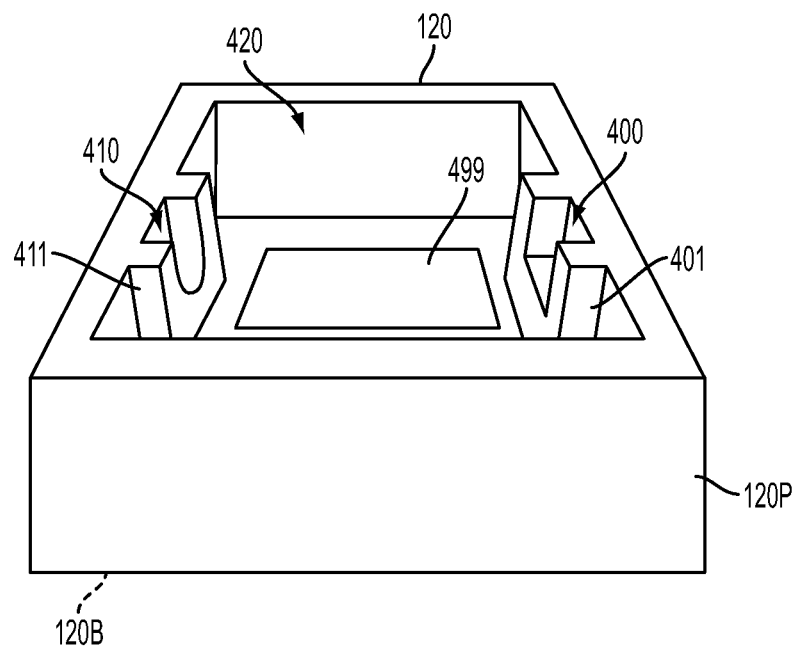
FIG. 4A is a schematic illustration of a portion of a footwear cleaning apparatus in accordance with an aspect of the disclosed embodiment.

Referring also to FIG. 4A, the housing 120 may include a bottom wall 120B and peripheral walls 120P that form an internal cavity 420. In one aspect, the bottom wall and peripheral walls of the housing 120 may be manufactured as having a one-piece or unitary construction. In another aspect, the bottom wall may be attached to the peripheral walls in a releasable manner such as by, for example, snaps, clips or any other suitable hardware that allows for the detachment or release of one component from another component. The internal cavity 420 may be suitably sized and shaped to at least partially house the brush assembly 130 (FIGS. 1A-3A) and to at least in part funnel or otherwise direct debris into the debris collector 150 (FIGS. 1A and 1B). Protrusions 401, 411 may be formed on opposite sides of the internal cavity 420. The protrusions may include respective slots, cavities or other suitable recessed features 400, 410 into which respective portions of the brush assembly 130 are inserted as will be described below. In other aspects the brush assembly 130 may be mounted at least partly within the internal cavity 420 in any suitable manner.

Figure 2A:
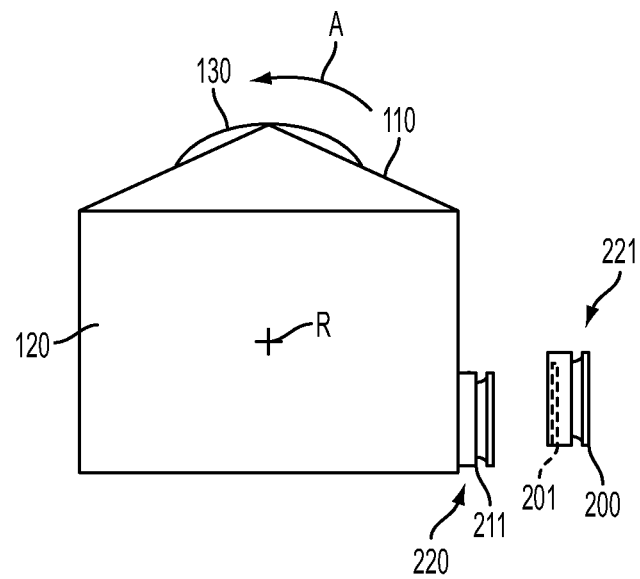
FIG. 2A is a schematic illustration of a portion of a footwear cleaning apparatus in accordance with an aspect of the disclosed embodiment.

Referring still to FIG. 1A and also to FIG. 2A, the housing 120 further includes at least one mounting flange 120F. In FIG. 1A the housing includes two mounting flanges 120F located towards a bottom of the housing 120 and on opposite sides of the housing 120. In this aspect the mounting flange(s) 120F is located adjacent a bottom of the housing 120 so that the footwear cleaning apparatus 100 can be mounted to any suitable surface (e.g. is surface mountable). In other aspects, as shown in FIG. 1B the at least one mounting flange can be a single flange 120F' that extends around a periphery of the housing 120. In FIG. 1B the mounting flange 120F' is shown as being located towards a top of the housing 120 but it should be understood that the mounting flange or flanges may be located at any suitable position at or between the top and bottom of the housing. Having a mounting flange 120F' adjacent the top of the housing 120 allows the footwear cleaning apparatus to be mounted substantially flush with, below or recessed in a surface such as a floor or other suitable surface so that at least a portion of the brush assembly protrudes above the surface.

It should also be understood that while the mounting flanges 120F, 120F' (generally referred to as mounting flanges 120F) are shown as being substantially straight in the Figures, in other aspects the mounting flanges may have any suitable contours that substantially correspond to a contour of a surface onto which the footwear cleaning apparatus 100 is to be mounted. For example, if the footwear cleaning apparatus is mounted to a floorboard of a car the mounting flange(s) are contoured to a shape of the floorboard so that the mounting surface of the flange(s) (e.g. the surface of the flange that interfaces with the floorboard) is in substantial contact with the floorboard substantially along the entirety of the mounting flange(s).

The mounting flange(s) 120F may, in one aspect, be integrally formed as a one-piece or unitary construction with the housing 120. In other aspects, the mounting flange(s) 120F may be removably attached (e.g. detachable/attachable) to the housing such that different mounting flanges having different contours can be removably attached to the housing in any suitable manner, such as through any suitable mechanical or chemical fasteners. The removably attached mounting flanges 120F can be selected depending upon the mounting application (e.g. the shape of the surface, the type of vehicle, the environment in which the footwear cleaning apparatus 100 is used, etc.) to allow for a common housing 120 to be mounted to any suitable surface having any suitable contour. The mounting flange(s) 120F may also include any suitable number of apertures 121 configured to allow passage of any suitable fastener through the mounting flange(s) 120F for securely mounting the footwear cleaning apparatus 100 to a surface. In other aspects, the mounting flange(s) 120F may include integral fasteners for securing the footwear cleaning apparatus 100 to a surface. For example, the mounting flange(s) 120F may include one or more of integral spikes, stakes, clips, hook and loop type fasteners, adhesives, etc. that may be substantially inserted into any suitable mounting surface or otherwise interface with the mounting surface for securing the footwear cleaning apparatus 100 to the mounting surface.

The discharge coupling 140 (FIGS. 1 A and 1 B) may be located on one or more sides of the housing 120 such that debris removed from the footwear can pass through the discharge coupling 140 and into the debris collector 150. As can be seen in, for example, FIG. 2A the discharge coupling includes a base member 220 fixed to the housing 120 and a removable member 221 that is removably attached to the base member 220 in any suitable manner, such as through, for example, interlocking protrusions and recesses 201, 211 reciprocally formed in the base and removable members 220, 221. It is noted that any suitable locking features may be included with the mating features of the base and removable members 211, 221 so that the removable member 221 is securely (but removably) fixed to the base member 220. The removable member 221 may also include a recessed lip 200 or other suitable retaining feature for securing the debris collector 150 to the removable member 221. In one aspect the debris collector may be secured directly to the base member 220 in a similar manner in which the debris collector 150 is secured to the removable member 221. The discharge coupling may be mounted to a side of the housing (FIG. 2A), to the bottom of the housing (FIG. 2B) or any other suitable location of the housing.

In the aspects of the disclosed embodiment shown in FIGS. 1A and 1B the debris collector 150 is illustrated as a closed container such as a bag, box, a removable tray 150' (FIG. 7A) or other suitable container that can be emptied in any suitable manner. The debris collector 150, 150' may be secured to, for example the discharge coupling 140 in any suitable manner such as tying with a string, tie-wrap, clips, elastics, hook and loop fasteners, etc. In another aspect, referring also to FIG. 2C the debris collector 251 may be in the form of a chute or tube that is mounted or fixed to the bottom, side or any other surface of the housing 120 where the passage through the chute or tube is in communication with the internal cavity 420 of the housing. The chute or tube may be open to the atmosphere or connected to any suitable vacuum source so that the debris may fall through the chute or tube and/or move through the tube under suction provided by, for example, the vacuum source.

The brush of the brush assembly 130 may be positioned relative to the inside walls of the housing 120 so that rotation or other suitable movement of the brush sweeps the debris into the debris collector 150 (FIGS. 1A-2B), 150' (FIG. 7A), 251 and/or through the chute or tube of debris collector 251. In one aspect, where a discharge of the debris collector (e.g. the mating end the base member 220 of debris collector 150 or the tube/chute of debris collector 251) is exposed or otherwise not coupled to a bag or box, the debris collector 150, 251 may include any suitable valve 250 (FIG. 2C) for closing passage to, for example, prevent animals, insects, road debris or other unwanted items from entering into the internal cavity 420 (FIG. 4A).

In one aspect the valve 250 may be configured to be operable through a switch, lever or other suitable device mounted to, for example, the housing 120 or cover 130 so that when the switch, lever, etc. is actuated the valve is opened (through any suitable linkage between the switch, lever, etc. and the valve) to allow free passage of the debris out of the internal cavity 420 the through the debris collector. In one example, rotation or other suitable movement of the brush assembly 130 may open the valve to discharge the debris from the internal cavity 420. In other examples, the switch, lever, etc. may be located so that it can be easily operated with a foot of a user of the footwear cleaning apparatus 100. Where the footwear cleaning apparatus 100 is mounted to, for example, a floorboard of a vehicle, the debris collector 251 may be configured such that air flowing between the underbody of the vehicle and the road creates a vacuum within the debris collector 251 that opens the valve 250 such that debris within the internal cavity is sucked out of the internal cavity through the vacuum formed in the debris collector. In this aspect the valve 250 may be configured with suitable spring mechanisms so that the valve remains closed until a predetermined vacuum pressure is reached within the debris collector 251.

Referring now to FIG. 3A, the brush assembly 130 may include a brush hub 311 and at least one brush body 325 with a plurality of bristle packs. The brush hub 311 and the brush body 325 may be made of any suitable material including, but not limited to, plastics, metals, alloys and composites. The bristle packs may be formed in any suitable manner and the bristles may be made of nylon or any other suitable material including but not limited to hair, wire and plastic. The bristles may be of such character that they do not hold contamination or spread any particles that are of a contagious nature. A spray system can be optionally employed within the footwear cleaning apparatus 100 to deliver liquids such as disinfectants, water or other products to a receiving surface such as the surface of the footwear.

The bristles may have any suitable thickness or they may vary in thickness if one needs more or less consistency for certain operations or functions. The length of the bristles may be any length that is suitable for cleaning footwear. In one aspect the bristles may have a length for cleaning footwear without substantially protruding past the cover 110 of the footwear cleaning apparatus 100. In other aspects the bristles may have a length for cleaning footwear that protrudes past the cover 110 of the footwear cleaning apparatus 100 by any suitable amount or distance. As may be realized, multiple interchangeable brush assemblies 130, 130A, 130B (FIG. 1A) may be provided each having a different cleaning characteristic. For example, each of the interchangeable brush assemblies may have bristles of differing length, stiffness, contour, roughness, materials, etc. so that a brush having a predetermined characteristic suitable for removing a predetermined type of debris from the footwear can be selected.

The brush body is an elongated member having a proximate and distal end. The brush body extends radially outward from the brush hub 311. In this exemplary embodiment, the brush body may be attached at its proximate end to the brush hub 311 in any suitable manner such as by, welding, chemical fasteners, mechanical fasteners or interference fits. The brush assembly may be configured so that the brush body can be replaced when the bristles are worn. In other embodiments the footwear cleaning apparatus 100 may be configured so that the brush assembly can be removed and replaced as necessary. The brush body may have any suitable number of apertures for receiving the bristle packs. The bristle packs may be retained inside the apertures in any suitable manner including adhesives and snaps.

The brush hub 311 may have an aperture located at its center that is sized to fit over the spindle 310 as can be seen in FIG. 3A. The size of the aperture in the brush hub 311 may be such that the brush assembly is free to rotate about the spindle 310 along a rotational axis R. In other aspects, the brush hub and spindle may be formed as a unitary one piece member such that the spindle ends rotate within, for example, recesses 400, 410 (FIG. 4A) of the housing 120. Referring also to FIG. 2A, the brush assembly 130 may yield to the movement of the footwear in the direction of arrow A upon insertion or passage of the footwear into or over the opening 11 OC (FIG. 1 A) of the cover 110 (e.g. movement of the footwear in the direction of arrow A, see FIGS. 2A and 2B, while in contact with the brush assembly 130 causes the brush assembly to rotate in the direction of arrow A) to remove debris from the footwear. The brush assembly may prevent rotation in the opposite direction when the footwear is removed from or passed over the opening 11 OC in the cover 11 0 to allow the brush assembly to remove additional debris from the footwear. This one way rotation about the spindle 310 and brush mounted thereto may be achieved through the implementation of a one-way engaging clutch or ratcheting mechanism 300 or any other suitable device which couples the spindle 310 and the brush hub 311. It is noted that the protrusion 411 may include a recess 410 configured to accept the spindle 310 and the protrusion 401 may include a recess 400 configured to accept the clutch 300 (see FIG. 4A). It is further noted that rotation of the brush assembly 130 in the direction of arrow A (FIGS. 2A and 2B) may be such that the debris falls from the brush assembly 130 onto, for example, the bottom surface of the internal cavity 420 (FIG. 4A). The shape of the internal cavity and the rotation of the brush may sweep and funnel the debris into the debris collector 150, 251 through an aperture of the coupling 140.

Figure 2B:
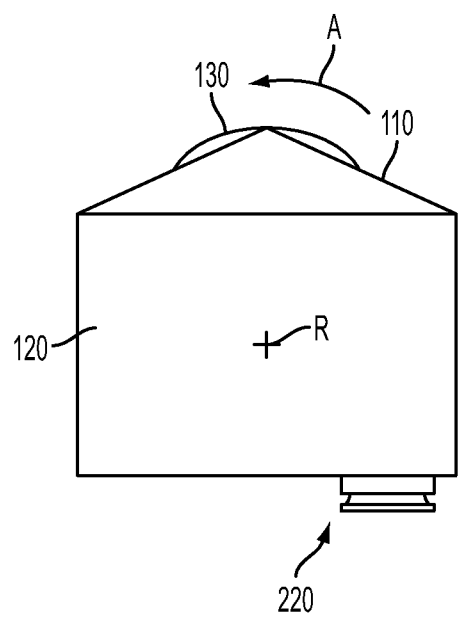
FIG. 2B is a schematic illustration of a portion of a footwear cleaning apparatus in accordance with an aspect of the disclosed embodiment.

In another aspect, referring to FIG. 3B the brush assembly may include a motor 350 that drives the brush assembly 130 for rotation in the direction of arrow A (FIGS. 2A and 2B). The motor 350 may be coupled to the spindle through any suitable transmission 360. In other aspects, the motor 350 and/or transmission 360 may drive the brush assembly 130 in a vibratory or otherwise oscillating (e.g. back and forth) motion. In still other aspects, the motor and/or transmission 360 may drive the brush assembly 130 in a combination of rotational and oscillatory motions. For example, the brush assembly 130 may be driven so that the brush assembly 130 makes one or more revolutions or a partial revolution in, for example, the direction of arrow A, then makes an oscillatory motion (e.g. with any suitable degree of rotation of the brush assembly about rotational axis R) and then makes another one or more revolutions or a partial revolution in the direction of arrow A (or in a direction opposite to arrow A) and so on.

The motor may be activated in any suitable manner such as through a motion activated sensor (e.g. proximity switch) located on or near one or more of the housing 120 or cover 110, by a remotely located switch, button, etc. or by a switch, button, etc. located on the housing 120 or cover. It is noted that the motor may be powered by an on-board battery or it may be wired to a power source, such as a battery of a vehicle in which the footwear cleaning apparatus 100 is mounted or to the mains power of a building.

The footwear cleaning apparatus 100 may also have one or more heating elements 499 (FIG. 4A) suitably located within the housing 120 such that any snow or ice that is introduced into the footwear cleaner is melted and directed out of the housing 120 through, for example, the discharge coupling 140. The heating elements 499 may be located along the bottom of the internal cavity 420, along the brush body, the brush hub, the cover and/or any other suitable location(s) of the footwear cleaning apparatus.

Figure 4B:
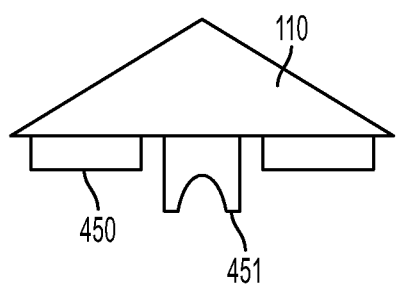
FIG. 4B is a schematic illustration of a portion of a footwear cleaning apparatus in accordance with an aspect of the disclosed embodiment.
Figure 4C:
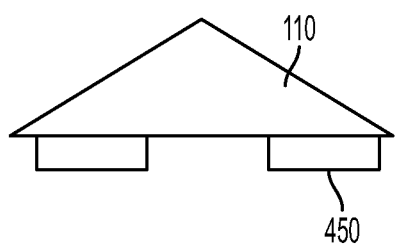
FIG. 4C is a schematic illustration of a portion of a footwear cleaning apparatus in accordance with an aspect of the disclosed embodiment.

Referring to FIGS. 4A, 4B and 4C, in one aspect, the cover 110 may have any suitable shape such that the bristles of the brush assembly do not substantially protrude past an outer surface of the cover 110. In other aspects, the cover 110 may be shaped to allow the bristles of the brush assembly to extend beyond the outer surface of the cover 110 by any suitable amount or distance. The cover may include a flange 450 that is configured to fit within the internal cavity 420 of the housing 120 for securing the cover to the housing. It is noted that the flange 450 may include protrusions and the internal cavity 420 may include corresponding recesses (or vice versa) for securing the cover 120 to the housing 110. In other aspects the cover may be secured to the housing in any suitable manner such as through any suitable mechanical or chemical fasteners. The cover 110 may also include one or more protrusions 451 that are configured to be inserted into one or more of the recesses 400, 410 to substantially hold the spindle 310 and/or clutch 300 (FIG. 3A) from lifting out of the respective recess 400, 410.

Figure 6A:
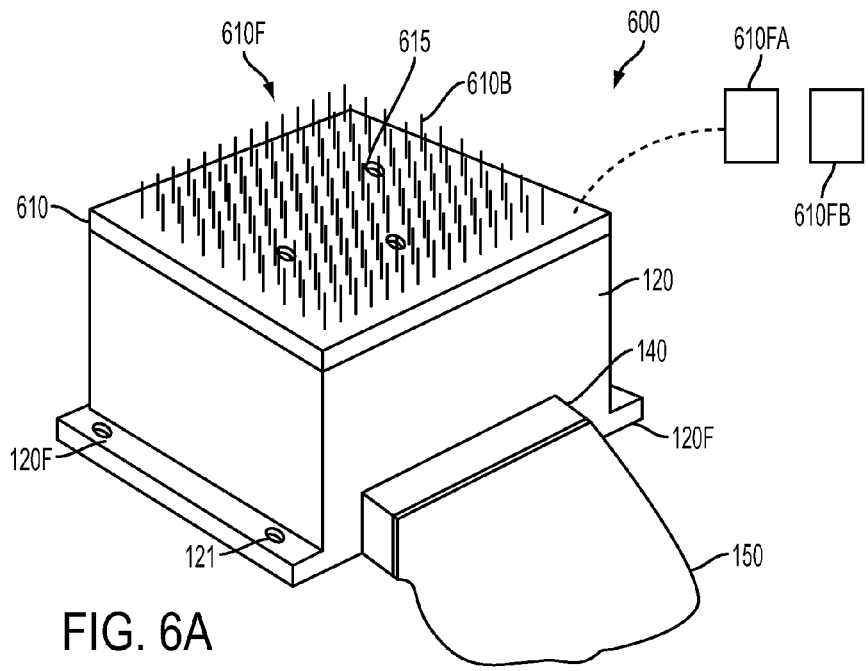
FIG. 6A is a schematic illustration of a footwear cleaning apparatus in accordance with an aspect of the disclosed embodiment.
Figure 6B:
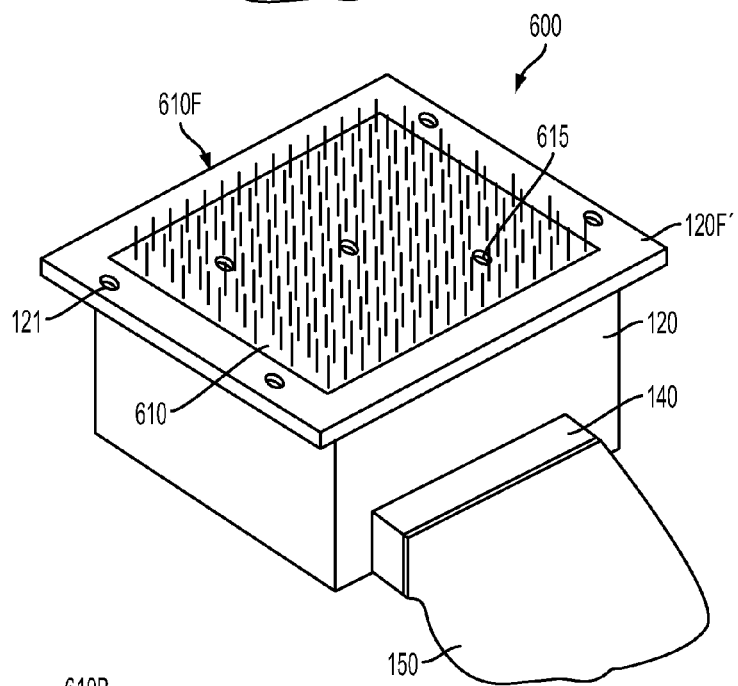
FIG. 6B is a schematic illustration of a footwear cleaning apparatus in accordance with an aspect of the disclosed embodiment.

Referring to FIGS. 6A and 6B a footwear cleaning apparatus 600 is shown in accordance with another aspect of the disclosed embodiment. In this aspect the apparatus 600 generally includes a housing 120, a cover 610, a discharge coupling 140 and a debris collector 150, 150' (see also FIG. 7A). The housing 120, the discharge coupling 140 and debris collector 150, 150' may be substantially similar to those described above. The cover 610 may include a brush assembly 610F and one or more apertures 615 that extend through the cover. The brush assembly 610F includes a plurality of free-standing bristles 610B having one free end extending away from the cover 610 and one anchored end secured to the cover 610 in any suitable manner (e.g. molding the bristles into the cover, mechanical or chemical adhesives, mechanical fasteners, etc.). In one aspect the brush assembly 610F may be of unitary or one piece construction with the cover 610 while in other aspects the brush assembly 610F may be affixed to the cover in any suitable manner. The bristles 610B of the brush assembly 610F may be constructed of any suitable material and have any suitable length, stiffness, contour, and/or texture (e.g. roughness) for brushing debris off of footwear. In a manner similar to that described above, multiple interchangeable brush assemblies 610F, 610FA, 610FB may be provided each having a different cleaning characteristic. For example, each of the interchangeable brush assemblies may have bristles of differing length, stiffness, contour, roughness, materials, etc. so that a brush having a predetermined characteristic suitable for removing a predetermined type of debris from the footwear can be selected.

Figure 6C:
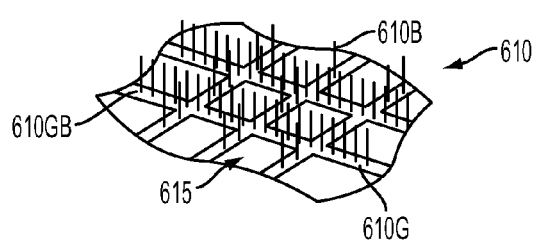
FIG. 6C is a schematic illustration of a footwear cleaning apparatus in accordance with an aspect of the disclosed embodiment.

As described above, the cover includes one or more apertures 615. The apertures 615 may have any suitable shape and/or size and be configured to allow debris to pass through the apertures 615, and hence the cover, for collection in the debris collector 150, 150'. In one aspect, the apertures 615 may be circular apertures (FIG. 6A) that are interspersed on the cover 610 between the bristles 610B. In another aspect the apertures 615 maybe arranged on the cover 610 so that at least a portion of the cover includes a grid 610G (FIG. 6C) having longitudinal and transverse bands 610GB. The apertures 615 may be disposed between the bands 610GB and the bristles 610B may be anchored or otherwise secured to the bands 610GB in any suitable manner.

Referring also to FIGS. 7A and 7C, the cover 610 may be configured to attach to the housing 120 in any suitable manner. For example, in one aspect the housing 120 may include a recess 120R that is suitably sized and shaped to receive at least a portion of the cover 610. The cover 610 may be held within the recess 120R in any suitable manner. For example, the cover 610 may be held within the recess 120R through a press or friction fit between the cover 610 and the recess 120R. In other aspects the recess 120R may include any suitable fasteners (e.g. clips, snaps, etc.) for holding the cover 610 within the recess 120R. In still other aspects the cover 610 may be secured within the recess by glue or other suitable adhesive, ultrasonic welding, screws or any other suitable mechanical and/or chemical fasteners. In another aspect the housing 120 may include locating features such as protrusions or recesses and the cover 610 may include corresponding recesses or protrusions that interface with the protrusions or recesses of the housing 120 for locating the cover 610 relative to the housing 120 such that the cover may be placed on top of the housing (e.g. not in a recess) and secured to the housing in any suitable manner such as through mechanical or chemical fasteners/adhesives. In one aspect the protrusions may be pins and the recesses may be corresponding holes configured to accept the pins. In another aspect the pins and holes may be configured to secure the cover 610 to the housing 120 such as through a friction fit and/or snapping or clipping action.

Figure 2C:
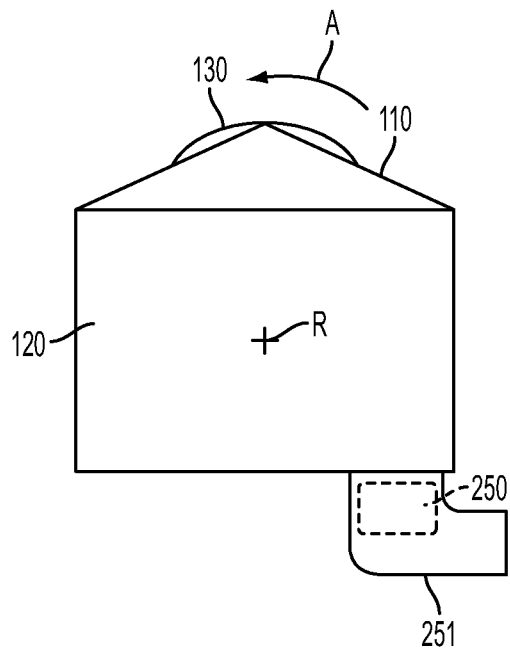
FIG. 2C is a schematic illustration of a portion of a footwear cleaning apparatus in accordance with an aspect of the disclosed embodiment.

Referring to FIGS. 7A-7C the inside walls (e.g. internal cavity 420) of the housing 120 may be shaped to direct any debris that falls through the apertures 615 into the debris collector 150, 150' or into a debris collector substantially similar to debris collector 251 (FIG. 2C). For example, the housing 120 may be configured to accept a removable tray 150' for the collection of debris. In this aspect the inside walls of the housing may be substantially straight so that the debris simply falls into the tray. In other aspects the inside walls may have any suitable contour for directing the debris into the removable tray.

Referring to FIG. 7B the housing 120 may be configured to accept a removal debris collector 150 such as, for exemplary purposes only, a bag or substantially rigid container that is removably affixed to a bottom of the housing 120 such as through discharge coupling 140. In this aspect one or more inside walls of the housing 120 may be contoured in any suitable manner for substantially funneling or otherwise directing the debris into an opening of the debris collector 150 which may be provided through the discharge coupling 140.

Similarly, referring to FIG. 7C the housing may be configured to accept a removable debris collector 150 that may be disposed or otherwise affixed on a side of the housing through discharge coupling 140. Here one or more inside walls of the housing may be contoured in any suitable manner for directing the debris into the debris collector 150 through the discharge coupling 140. In other aspects, such as where the footwear cleaning apparatus 600 (FIGS. 6A and 6B) is mounted to or otherwise attached to the floor of an automobile or other moving object, holes or any other suitable valve(s), such as valve 250 (FIG. 2C), may be provided that are configured to create a vacuum within the housing as the vehicle is moving. For example, air rushing past a hole in the discharge coupling 140 and/or debris collector 150 or rushing by a valve disposed in proximity to the discharge coupling 140 and/or debris collector 150 may cause the valve to open and create a drop in pressure within the housing 120 causing the debris to flow or otherwise be moved towards the debris collector 150. In another aspect a debris collector (e.g. bag, box, tray, etc.) may not be provided such that as the valve is opened the debris collected within the housing may be discharged in a manner substantially similar to that described above with respect to FIG. 2C. As may be realized, while the internal configuration of the housing 120 is described in FIGS. 7A-7C with respect to brush assembly 610F it should be understood that the internal configurations of the housing 120 describe with respect to FIGS. 7A-7C may also be applied in a manner substantially similar to that described above when brush assembly 130 is mated with the housing 120.

In operation, a user may move footwear across the bristles 610B for brushing debris from the footwear. The debris may fall from the footwear through the apertures 615 in the cover 610 (FIGS. 6A and 6B). The debris may then pass through the housing 120 under the influence of gravity and/or suction and may be directed by the inside walls of the housing into the debris collector 150, 150' or discharged through a valve. Where a debris collector 150, 150' is used the user may periodically remove the debris collector 150, 150' for cleaning, replacement and/or emptying.

Figure 5:
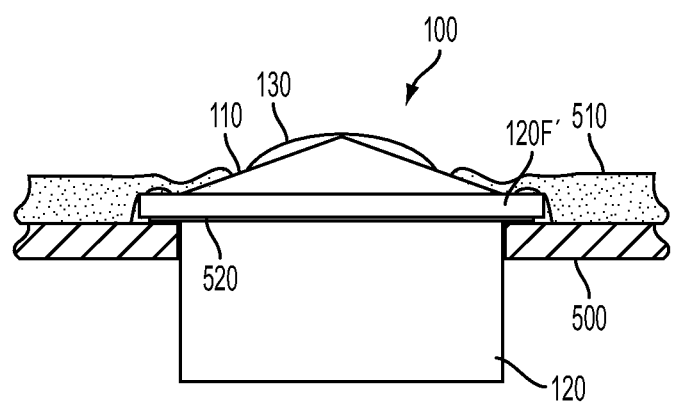
FIG. 5 is a schematic illustration of a footwear cleaning apparatus in accordance with an aspect of the disclosed embodiment.

The footwear cleaning apparatus 100, 600 described above can be implemented in any suitable environment. For example, the footwear cleaning apparatus 100, 600 can be flush mount in a deck by a pool or in the floorboards of a vehicle. The footwear cleaning apparatus 100, 600 can be used to clean the feet of users as the users enter the pool to prevent grass and dirt from being introduced into the pool water. When placed in the floorboard 500 of an automobile as shown in FIG. 5, the carpeting or floor covering 510 may be placed over at least a portion of the cover half 110 and/or at least a portion of the mounting flange 120F'. The cover 110 and/or brush assembly 130, 610 may include a pattern and/or color that matches the floor covering 510 such that the footwear cleaner 100, 600 is substantially hidden. A user may use footwear cleaning apparatus 100, 600 such that each foot can be cleaned as the user enters the vehicle. The footwear cleaning apparatus 100, 600 can also be placed in front of an entrance door to a building or even hidden within in a sidewalk or walkway.

In accordance with one or more aspects of the disclosed embodiment a footwear cleaning apparatus is provided. The footwear cleaning apparatus includes a housing having an opening, an internal cavity and a discharge aperture, the internal cavity being shaped to move debris through the discharge aperture, a cover for at least partly covering the opening, and a brush assembly connected to the housing.

In accordance with one or more aspects of the disclosed embodiment the brush assembly includes bristles having a free end extending away from the cover and a fixed end fixed to the cover.

In accordance with one or more aspects of the disclosed embodiment the cover includes one or more apertures interspersed between the bristles and configured to allow debris to pass through the apertures into the housing.

In accordance with one or more aspects of the disclosed embodiment the brush assembly includes a ratcheting mechanism configured to allow rotation of the brush assembly relative to the housing in substantially a single direction.

In accordance with one or more aspects of the disclosed embodiment the housing includes a mounting flange configured so that the footwear cleaning apparatus is surface mountable.

In accordance with one or more aspects of the disclosed embodiment the housing includes a mounting flange configured so that the footwear cleaning apparatus is mountable substantially below a walking surface or floor.

In accordance with one or more aspects of the disclosed embodiment the footwear cleaning apparatus further includes a debris collector removably coupled to the discharge aperture.

In accordance with one or more aspects of the disclosed embodiment the debris collector includes a bag, box, tray.

In accordance with one or more aspects of the disclosed embodiment the cover is removably attached to the housing.

In accordance with one or more aspects of the disclosed embodiment the brush assembly includes a vibratory mechanism configured to allow oscillation of the brush assembly relative to the housing in substantially a single direction.

In accordance with one or more aspects of the disclosed embodiment a footwear cleaning apparatus is provided. The footwear cleaning apparatus includes a housing having an opening, an internal cavity and a discharge aperture, the internal cavity being shaped to move debris through the discharge aperture, a cover for at least partly covering the opening, and an interchangeable brush assembly connected to the housing, the brush assembly being selectable from a number of interchangeable brush assemblies each having a different predetermined cleaning characteristic.

In accordance with one or more aspects of the disclosed embodiment the interchangeable brush assembly includes bristles having a free end extending away from the cover and a fixed end fixed to the cover.

In accordance with one or more aspects of the disclosed embodiment the cover includes one or more apertures interspersed between the bristles and configured to allow debris to pass through the apertures into the housing.

In accordance with one or more aspects of the disclosed embodiment the interchangeable brush assembly includes a ratcheting mechanism configured to allow rotation of the interchangeable brush assembly relative to the housing in substantially a single direction.

In accordance with one or more aspects of the disclosed embodiment the housing includes a mounting flange configured so that the footwear cleaning apparatus is surface mountable or mountable substantially below a walking surface or floor.

In accordance with one or more aspects of the disclosed embodiment the footwear cleaning apparatus further includes a debris collector removably coupled to the discharge aperture.

In accordance with one or more aspects of the disclosed embodiment the debris collector includes a bag, box, tray.

In accordance with one or more aspects of the disclosed embodiment the cover is removably attached to the housing.

In accordance with one or more aspects of the disclosed embodiment the interchangeable brush assembly includes a vibratory mechanism configured to allow oscillation of the interchangeable brush assembly relative to the housing.

In accordance with one or more aspects of the disclosed embodiment a footwear cleaning apparatus is provided. The footwear cleaning apparatus includes a housing having an opening, an internal cavity and a discharge aperture, the internal cavity being shaped to move debris through the discharge aperture, a cover for at least partly covering the opening, and a brush assembly, wherein the brush assembly is disposed at least partly within the internal cavity and having bristles that are accessible through an opening of the cover, or disposed on the cover and having bristles that extend away from the internal cavity.

It should be understood that the foregoing description is only illustrative of the aspects of the disclosed embodiment. Various alternatives and modifications can be devised by those skilled in the art without departing from the aspects of the disclosed embodiment. Accordingly, the aspects of the disclosed embodiment are intended to embrace all such alternatives, modifications and variances that fall within the scope of the appended claims. Further, the mere fact that different features are recited in mutually different dependent or independent claims does not indicate that a combination of these features cannot be advantageously used, such a combination remaining within the scope of the aspects of the invention.

What is claimed is:

1. A footwear cleaning apparatus comprising:
    a housing having an opening, an internal cavity and a discharge coupling located on a side of the housing, the internal cavity being shaped to move debris through the discharge coupling,
    a brush assembly, the internal cavity having recesses formed on opposite sides of the internal cavity into which end portions of the brush assembly are inserted;
    a cover for at least partly covering the opening, the cover comprising one or more protrusions positioned to be inserted into the recesses of the internal cavity to hold the brush assembly;
    the discharge coupling comprising:
        a base member fixed to the housing and having a recess; and
        a removable member removably attached to the base member by way of a protrusion interlocking with the recess.

2. The footwear cleaning apparatus of claim 1, wherein the brush assembly includes a ratcheting mechanism configured to allow rotation of the brush assembly relative to the housing in substantially a single direction.

3. The footwear cleaning apparatus of claim 1, wherein the housing includes a mounting flange configured so that the footwear cleaning apparatus is surface mountable.

4. The footwear cleaning apparatus of claim 1, wherein the housing includes a mounting flange configured so that the footwear cleaning apparatus is mountable substantially below a surface.

5. The footwear cleaning apparatus of claim 1, further comprising a debris collector removably coupled to the discharge coupling.

6. The footwear cleaning apparatus of claim 5, wherein the debris collector includes a bag.

7. The footwear cleaning apparatus of claim 1, wherein the cover is removably attached to the housing.

8. The footwear cleaning apparatus of claim 1, wherein the brush assembly includes a vibratory mechanism configured to drive the brush assembly.

9. The footwear cleaning apparatus of claim 1, wherein the brush assembly includes a motor configured to drive the brush assembly.

10. A footwear cleaning apparatus comprising:
  a housing having an opening, an internal cavity and a discharge coupling located on a side of the housing, the internal cavity being shaped to move debris through the discharge coupling;
  an interchangeable brush assembly being selectable from a number of interchangeable brush assemblies each having a different predetermined cleaning characteristic, the internal cavity having recesses formed on opposite sides of the internal cavity into which end portions of the interchangeable brush assembly are inserted; and
  a cover for at least partly covering the opening, the cover comprising one or more protrusions positioned to be inserted into the recesses of the internal cavity to hold the interchangeable brush assembly;
  the discharge coupling comprising:
    a base member fixed to the housing and having a recess; and
    a removable member removably attached to the base member by way of a protrusion interlocking with the recess.

11. The footwear cleaning apparatus of claim 10, wherein the interchangeable brush assembly includes a ratcheting mechanism configured to allow rotation of the interchangeable brush assembly relative to the housing in substantially a single direction.

12. The footwear cleaning apparatus of claim 10, wherein the housing includes a mounting flange configured so that the footwear cleaning apparatus is surface mountable or mountable substantially below a surface.

13. The footwear cleaning apparatus of claim 10, further comprising a debris collector removably coupled to the discharge coupling.

14. The footwear cleaning apparatus of claim 13 wherein the debris collector includes a bag.

15. The footwear cleaning apparatus of claim 10, wherein the cover is removably attached to the housing.

16. The footwear cleaning apparatus of claim 10, wherein the interchangeable brush assembly includes a vibratory mechanism configured to drive the interchangeable brush assembly.

17. The footwear cleaning apparatus of claim 10, wherein the interchangeable brush assembly includes a motor configured to drive the interchangeable brush assembly.

18. A footwear cleaning apparatus comprising:
  a housing having an opening, an internal cavity and a discharge coupling located on a side of the housing, the internal cavity being shaped to move debris through the discharge coupling;
  a brush assembly disposed at least partly within the internal cavity and having bristles, the internal cavity having recesses formed on opposite sides of the internal cavity into which end portions of the brush assembly are inserted;
  a cover for at least partly covering the opening, the cover comprising one or more protrusions positioned to be inserted into the recesses of the internal cavity to hold the brush assembly, the bristles of the brush assembly being accessible through an opening of the cover;
  the discharge coupling comprising:
    a base member fixed to the housing and having a recess; and
    a removable member removably attached to the base member by way of a protrusion interlocking with the recess.

* * * * *